UNITED STATES PATENT OFFICE.

WARREN E. EMLEY, OF WASHINGTON, DISTRICT OF COLUMBIA.

PROCESS OF MAKING PLASTIC CALCINED GYPSUM.

1,392,574.  Specification of Letters Patent.  Patented Oct. 4, 1921.

No Drawing.  Application filed February 3, 1921. Serial No. 442,313.

(FILED UNDER THE ACT OF MARCH 3, 1883, 22 STAT. L., 625.)

*To all whom it may concern:*

Be it known that I, WARREN E. EMLEY, a citizen of the United States, residing at Washington, in the District of Columbia, have invented new and useful Improvements in the Process of Making Plastic Calcined Gypsum, of which the following is a specification.

This application is filed under the act of March 3, 1883, under the terms of which, the applicant agrees that the invention described herein, if patented, may be used by the Government or any of its officers or employees in prosecution of work for the Government, or by any other person in the United States without the payment to him of any royalty thereon.

Calcined gypsum, or plaster of Paris, is a chemical compound of the formula $CaSO_4 \cdot \tfrac{1}{2}H_2O$. It is of crystalline structure and sandy character. Because of this characteristic, calcined gypsum cannot be used alone for the white or finishing coat of plaster: the plasterer is not physically able to spread it. For the same reason, not more than two or three parts (by weight) of sand may be added to it in the preparation of the scratch or brown coats of plaster. This characteristic is described in the trade as "non-plastic."

It is quite possible to make a material sufficiently plastic for white coat work from calcined gypsum by the addition of other materials. It is known, for instance, that the addition of molasses, of certain other organic materials, or of loamy sand, will improve the plasticity of the calcined gypsum. In the 1919 *Tentative Report on Gypsum Plasters*, issued by the American Society for Testing Materials, it is stated that a neat gypsum plaster may contain up to 15 per cent. of "hydrated lime, ground clay, asbestos, retarder, or fiber." In the 1920 report, this was changed to permit the addition of 15 per cent. of "materials to control the working quality, setting time and fibering." It is general trade practice to add hydrated lime to calcined gypsum in the manufacture of neat gypsum plaster. In the 1919 report quoted above, it is recommended that plaster for white coat work be composed of 75 per cent. lime putty and 25 per cent. calcined gypsum. Practically all white coat plaster is composed of these two ingredients, although the proportions of them are variable.

If calcined gypsum is ground after calcination, one of two things may occur: If the grinding is not severe, the crystals will be reduced in size, but the sandy or non-plastic nature of the material will still remain. If the grinding is very severe, a chemical change can be made to occur, the water being actually ground out of the material. In actual practice, a buhr mill or tube mill is used for this grinding, and any water which is liberated is evaporated and carried off by the current of air passing through the mill. The resultant product is known as "soluble anhydrite." This is anhydrous calcium sulfate, but it differs from the naturally occurring anhydrite in that it has a great affinity for water. So great is this affinity that a few moments exposure to moist air is sufficient for it to recombine with enough water to change back to the original calcined gypsum. Because of this fact, and also because the soluble anhydrite is itself crystalline, the effect of this severe grinding is lost, and the product is still non-plastic. Commercial gypsum plasters consist mostly of calcined gypsum, with more or less soluble anhydrite and/or undecomposed gypsum.

I find that if calcined gypsum is ground severely so as to liberate the water, but in such a way that the water cannot escape, the resultant product has radically different properties. It is now plastic, rather than non-plastic. This can be proved by testing the material by means of the Carson blotter test as described in the *Transactions of the National Lime Manufacturers Association*, 1916, p. 175, or by means of a plasticimeter. It can be used alone as the white coat of plaster, and can be used with at least six parts (by weight) of sand for the scratch or brown coats. When compared with the original material, it will be found to require more water to mix it to a given consistency, that it sets more slowly, and that it will develop higher strength after setting. To use this material as a wall plaster, it will, of course, be necessary to retard it, using for this purpose the ordinary reagents which are used in the manufacture of wall plaster from calcined gypsum.

If it is not practicable to grind the calcined gypsum in such a way as to prevent evaporation of the liberated water, the same end can be attained by adding, either before or during the grinding, enough water to make up for the quantity evaporated, so that the final product will contain approximately one molecule of water to two molecules of calcium sulfate.

At a meeting of Committee C-7 on Lime, of the American Society for Testing Materials, held on January 12, 1921, directions were adopted for the use of the plasticimeter described in Bureau of Standards *Technologic Paper No. 169*, and for the calculation of "plasticity figures." It was also decided that a lime putty, to be satisfactory for finishing purposes (white-coat work) must have a plasticity figure of not less than 200.

This plastic calcined gypsum may be produced from substances other than calcined gypsum. The same end product will result if raw gypsum is ground in such a way that some, but not all, of its water is allowed to escape; or if the requisite proportion of water is ground into anhydrite, either soluble or natural.

Specifically, I find that if calcined gypsum is ground in a ball mill or similar sealed container, with such severity as to liberate the water of crystallization, the resultant product will be at least as plastic as "finishing" hydrated lime. This grinding may be either in addition to or in lieu of the usual grinding which is a part of the regular process of manufacture of calcined gypsum. The duration of the grinding, which determines the plasticity of the finished product, depends upon the quality (fineness) of the original material, and also upon the size of the mill. In a small laboratory mill, it required 7 hours to produce one pound of material of the desired plasticity; in a larger mill, it required 4 hours for 80 pounds of material. I find that plastic calcined gypsum can be made by this method from calcined gypsum from any source, and that storage for four months does not cause any noticeable deterioration of its plasticity.

I claim:

1. The process of increasing the plasticity of calcined gypsum which comprises the grinding of the calcined gypsum and preventing escape of its water content.

2. The process of increasing the plasticity of calcined gypsum which comprises grinding the calcined gypsum and maintaining its water content.

3. The process of increasing the plasticity of calcined gypsum which consists in grinding the calcined gypsum to eliminate the water content during the grinding operation, preventing the escape of the said water content during the grinding step, and continuously keeping the above treated gypsum in contact with the water thus eliminated and permitting the water thus eliminated to be reabsorbed before ceasing the grinding operation.

4. The process of increasing the plasticity of calcined gypsum which comprises grinding the calcined gypsum, with the addition, before the grinding operation, of enough water to make up for that lost by evaporation during the grinding.

5. The process of increasing the plasticity of calcined gypsum which comprises grinding the calcined gypsum, with the addition, before the cessation of the grinding operation, of enough water to make up for that lost by evaporation during the grinding.

6. A plastic calcined gypsum which, when properly retarded, will give a plasticity figure of at least 200.

7. A plastic calcined gypsum having a plasticity figure of at least 200, the plasticity of which is not dependent upon the addition of any foreign material.

8. A plastic calcined gypsum having a plasticity figure of at least 200, the plasticity of which is not dependent upon the addition of lime.

9. A plastic calcined gypsum, having a plasticity figure of at least 200, the plasticity of which is not dependent upon the addition of other forms of calcium sulfate.

10. A plastic gypsum plaster, containing calcium sulfate and water in approximately the same proportions as found in the hemihydrate, uncombined, with a high degree of plasticity.

11. A plastic gypsum plaster containing calcium sulfate and water in approximately the same proportions as found in the hemihydrate, uncombined, with a high degree of plasticity, independent of the addition of foreign materials.

In testimony whereof, witness my signature this 2nd day of February, 1921.

WARREN E. EMLEY.